US012371150B2

(12) United States Patent
Heck

(10) Patent No.: US 12,371,150 B2
(45) Date of Patent: Jul. 29, 2025

(54) SLAT ARRANGEMENT FOR A WING OF AN AIRCRAFT

(71) Applicant: Airbus Operations GmbH, Hamburg (DE)

(72) Inventor: Christian Heck, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 592 days.

(21) Appl. No.: 17/776,339

(22) PCT Filed: Nov. 3, 2020

(86) PCT No.: PCT/EP2020/080817
§ 371 (c)(1),
(2) Date: May 12, 2022

(87) PCT Pub. No.: WO2021/099109
PCT Pub. Date: May 27, 2021

(65) Prior Publication Data
US 2022/0396348 A1     Dec. 15, 2022

(30) Foreign Application Priority Data
Nov. 18, 2019    (DE) .......................... 102019131054.7

(51) Int. Cl.
    B64C 9/22      (2006.01)
    B64C 9/02      (2006.01)

(52) U.S. Cl.
    CPC . B64C 9/22 (2013.01); B64C 9/02 (2013.01)

(58) Field of Classification Search
    CPC .................................. B64C 9/02; B64C 9/22
    See application file for complete search history.

(56) References Cited

U.S. PATENT DOCUMENTS

| | | | | |
|---|---|---|---|---|
| 2,541,565 A | * | 2/1951 | Ziegler | ...................... B64C 9/22 244/210 |
| 3,831,886 A | * | 8/1974 | Burdges | ................... B64C 9/22 244/214 |
| 7,611,099 B2 | * | 11/2009 | Kordel | ...................... B64C 7/00 277/645 |

(Continued)

FOREIGN PATENT DOCUMENTS

| | | | |
|---|---|---|---|
| CN | 115107990 A | * 9/2022 | ............ B64C 13/30 |
| DE | 1907710 A1 | 8/1970 | |

(Continued)

OTHER PUBLICATIONS

International Search Report; priority document.

*Primary Examiner* — Assres H Woldemaryam
*Assistant Examiner* — Aaron M Rodziwicz
(74) *Attorney, Agent, or Firm* — Greer, Burns & Crain, Ltd.

(57) ABSTRACT

A slat arrangement for a wing of an aircraft. The arrangement has a movable leading-edge slat and a connection section. The leading-edge slat includes a slat leading edge and a slat trailing edge. The connection section includes a receiving opening for receiving the slat trailing edge. The connection section includes an overhang having a free end. The slat trailing edge is configured to be translated under the overhang. A trailing region of the slat is configured to be elastically deformed by the overhang when the slat trailing edge is moved into the receiving opening.

16 Claims, 2 Drawing Sheets

(56) References Cited

U.S. PATENT DOCUMENTS

| | | | |
|---|---|---|---|
| 8,534,610 B1 * | 9/2013 | Pitt | B64C 9/22 |
| | | | 244/214 |
| 9,422,050 B2 | 8/2016 | Schlipf et al. | |
| 2010/0019095 A1 * | 1/2010 | Grohmann | B64C 7/00 |
| | | | 244/210 |
| 2010/0133387 A1 * | 6/2010 | Wood | B64C 3/48 |
| | | | 244/219 |
| 2012/0097791 A1 * | 4/2012 | Turner | B64C 9/24 |
| | | | 244/1 N |
| 2013/0075536 A1 | 3/2013 | Schröder | |
| 2015/0210379 A1 * | 7/2015 | Henning | B64C 9/22 |
| | | | 244/214 |
| 2018/0141637 A1 * | 5/2018 | Schlipf | B64C 9/22 |
| 2019/0112029 A1 * | 4/2019 | Turner | B64C 3/50 |

FOREIGN PATENT DOCUMENTS

| | | | | |
|---|---|---|---|---|
| DE | 102007024371 A1 | | 11/2008 | |
| DE | 102010014792 A1 | | 10/2011 | |
| EP | 2509859 B1 | | 5/2014 | |
| EP | 4063257 A1 | * | 9/2022 | ............ B64C 13/30 |
| EP | 4286270 A1 | * | 12/2023 | ............ B64C 9/02 |
| WO | WO-2008071399 A1 | * | 6/2008 | ............ B64C 7/00 |
| WO | 2011069887 A2 | | 6/2011 | |

* cited by examiner

SLAT ARRANGEMENT FOR A WING OF AN AIRCRAFT

CROSS-REFERENCES TO RELATED APPLICATIONS

This application claims the benefit of the International Application No. PCT/EP2020/080817, filed on Nov. 3, 2020, and of the German patent application No. 102019131054.7 filed on Nov. 18, 2019, the entire disclosures of which are incorporated herein by way of reference.

FIELD OF THE INVENTION

The invention relates to a slat arrangement for a wing of an aircraft, a wing for an aircraft, as well as an aircraft having such a slat arrangement.

BACKGROUND OF THE INVENTION

Movable components on an aircraft wing, such as slats or flaps, are usually movable between a fully retracted position and at least one and preferably a plurality of extended positions. In the retracted position, gaps between the respective movable component and the neighboring sections of the wing should be prevented as much as possible. This leads to an improved surface quality to reduce an aerodynamic impact. For a specific technology like natural laminar flow or hybrid laminar flow, tolerances regarding the aerodynamic surface are very strict. For providing smooth transitions between adjacent surface sections of flow bodies, often filler material and surface smoothing manufacturing steps are used. However, for moving components like a slat or similar this is not possible.

U.S. Pat. No. 9,422,050 B2 discloses a leading edge slat arranged on the airfoil of an aircraft, wherein the slat is provided on the front of the main wing. The slat comprises a trailing edge which by means of a device generates a contact force is loaded for making contact between the trailing edge of the slat.

SUMMARY OF THE INVENTION

It is an object of the invention to provide a leading-edge slat, which is capable of being moved on an aircraft wing and which allows a very smooth transition to a surrounding part of a wing in a retracted position.

A slat arrangement for a wing of an aircraft is proposed, the arrangement having a movable leading-edge slat and a connection section, wherein the leading-edge slat comprises a slat leading edge and a slat trailing edge, wherein the connection section comprises a receiving opening for receiving the slat trailing edge, wherein the connection section comprises an overhang having a free end, wherein the slat trailing edge is designed to be translated under the overhang, and wherein a trailing region of the slat is configured to be elastically deformed by the overhang when the slat trailing edge is moved into the receiving opening.

The leading-edge slat is a flow body, which is couplable with a base wing of an aircraft and which is movable from a retracted position to one or more extended positions. The slat and the base wing preferably comprise a complementary design, such that in the retracted position, the slat and the base wing create a closed surface. For this purpose, a base wing may comprise a wing leading edge, which comprises a chordwise depression, into which the slat may be moved. The slat may comprise a common shape, which may comprise stiffening elements covered by a slat skin. The slat comprises a profile and a nose, which will be placed directly into the airflow at least in the extended positions. Furthermore, the slat comprises a trailing edge, which points to the base wing, when the slat arrangement is attached to a wing.

The connection section is to be interpreted as a part, a component, an integrated section or a region of a component or an assembly integrated to the base wing. The connection section basically provides a receiving opening, into which the trailing edge may be moved. The receiving opening may be delimited at its upper side by the overhang. The overhang in turn may be a part of a skin of the base wing or it may be a separate part that is attachable to the base wing. The overhang is fixedly positioned on the base wing and cannot move. It merely allows to move the slat trailing edge underneath it.

The slat trailing edge is designed to be translated under the overhang. This means, that the trailing edge has a shape that allows to move the trailing edge into the receiving opening and underneath the overhang. It may comprise geometric features at the upper surface that allow to smoothly rest the overhang upon. Thus, the overhang and the slat provide a closed upper surface in the retracted position, on which the air flow travels during flight. For providing a particularly precise alignment of the trailing edge and the overhang to form a very smooth transition between the upper outer surfaces of each other, the trailing region of the slat is configured to be elastically deformed by the overhang. By moving the trailing edge into the receiving opening, the trailing region can be deformed. It may be feasible to let the trailing edge press onto an inner, downward facing side of the overhang. It may also be feasible to let the overhang press into the trailing region at least in a chordwise direction. By this, the trailing region and the overhang snugly fit onto each other, and gaps and steps can be minimized. The compression of the trailing region allows to close gaps and steps that are existing due to the positioning tolerance of the moving slat. By forcing the trailing region to the fixed overhang, the tolerance of the interface is reduced to the part tolerance of the slat trailing edge and the connection section.

In an advantageous embodiment, the overhang comprises a greater stiffness than the trailing region of the leading-edge slat. Providing the great stiffness at the overhang, the overhang is clearly less deformable than the trailing region of the slat. It may provide a sufficiently large force onto the trailing region to deform it as desired. To achieve a sufficient deformation of the trailing region it is reasonable to balance the stiffnesses of the trailing region and the overhang. This may, for example, be achieved by suitable material choices and/or a certain detail design of the respective components.

Furthermore, an upper edge component may be arranged on an upper side of the trailing region of the slat trailing edge. The upper edge component may then be the only component, that provides a surface contact with the overhang. It may comprise a sufficiently sturdy surface to withstand a large number of extension motions of the slat, preferably a number that corresponds to the expected lifetime of the slat. For example, it may be coated with a friction reducing coating and/or it may be made of a material that is at least as hard as the overhang.

It may also be advantageous if the upper edge component is made from a metallic material. Exemplary, it may comprise Titanium, an Aluminum alloy and a steel, preferably a stainless steel. The upper edge component may be welded, bolted, glued or riveted to the remaining structure of the slat. For minimizing the weight it may comprise a thickness that is only a fraction of the thickness of the trailing edge. It is particularly preferred to produce the upper edge component by a machining process.

According to an advantageous embodiment, a transversal cross-sectional profile of the upper edge component comprises a step to receive the overhang. The step is preferably designed to correspond to the outer end of the overhang. The overhang comes into a flush contact with the step when moving the trailing edge into the receiving opening. The step preferably comprises a height that corresponds to the thickness or height of the overhang. Thus, a smooth transition between the slat and the overhang is conducted.

In an advantageous embodiment, the upper edge component comprises a receiving surface for receiving the overhang, wherein the overhang extends about a greater chordwise length than the receiving surface. Thus, the overhang can always reach a mechanical stop on the upper edge component. Thus, a gap between the overhang and the upper edge component can always be prevented. The motion of the slat may be adapted to slightly compress the trailing region of the slat, when the overhang reaches set mechanical stop. This means, that the motion of the slat may slightly exceed the required motion to reach the mechanical stop with the overhang.

Furthermore, the trailing region may comprise an extension component, which delimits the slat at the trailing edge and which extends along a part of the slat in a spanwise direction. The extension component may be designed to be responsible for the deformation behavior of the trailing region. It may be made from a suitable deformable material that allows a compression, deflection or a bending.

In another advantageous embodiment, the extension component may be made from a plastic material. The plastic materials may comprise a thermoplastic material. It may exemplarily include polyvinylidene fluoride (PVDF), Polyamide (PA), Polytetrafluoroethylene (PTFE), polyetherketoneketone (PEKK), polyetheretherketone (PEEK), etc. However, the material is not limited thereto.

It is preferred if the upper edge component is arranged on an upper side of the extension component. The extension component faces a certain force exerted by the overhang leading to a deformation. Only the upper edge component mechanically interacts with the overhang and transfers the force directly into the extension component. The extension component is thus protected from abrasion or other deteriorating effects. By attaching the upper edge component on the extension component, the use of a relatively soft material in relation to the remaining part of the slat is supported.

In a further advantageous embodiment, the extension component comprises at least one spanwise step for receiving the upper edge component. The first step supports the upper edge component. By arranging the step to reduce the height of the extension component in a rearward chordwise direction, it may support the placement of the upper edge component, since it will be pushed against the extension component when moving the trailing edge into the receiving opening.

According to a further advantageous embodiment, the leading-edge slat comprises an outer skin, which encloses at least a part of the extension component. Thus, the extension component supports the trailing region as a stiffening element or a bridge between two skin sections. The stiffness of the slat in the trailing region is thus supported by the extension component.

It may be feasible if the extension component is pretensioned to deflect in an upwards direction in an extended position of the slat. Thus, the extension component urges upwards into the direction of the overhang. It thus assists to provide a flush surface contact to the overhang.

The arrangement may additionally comprise a spring element that is configured to deflect the extension component upwards. Instead or additionally to the above pretensioning, also a spring element can be used to deflect the extension component upwards. Several spring elements may be attached to the trailing region that are distributed along a chordwise line.

The invention also relates to a wing for an aircraft, having a base wing with a base wing leading edge, the wing further comprising at least one slat arrangement according to the above description, wherein the connection section is arranged on the base wing leading edge.

Still further, the overhang may be a part of a wing skin of the base wing. In the base wing a depression may be provided forward of the overhang. The overhang thus slightly reaches above the depression to define the receiving opening, which allows the trailing edge to be moved underneath.

Still further, the invention also relates to an aircraft comprising at least one slat arrangement according to the above description and/or at least one wing as explained above.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION OF THE PREFERRED EMBODIMENTS

Figure 1:
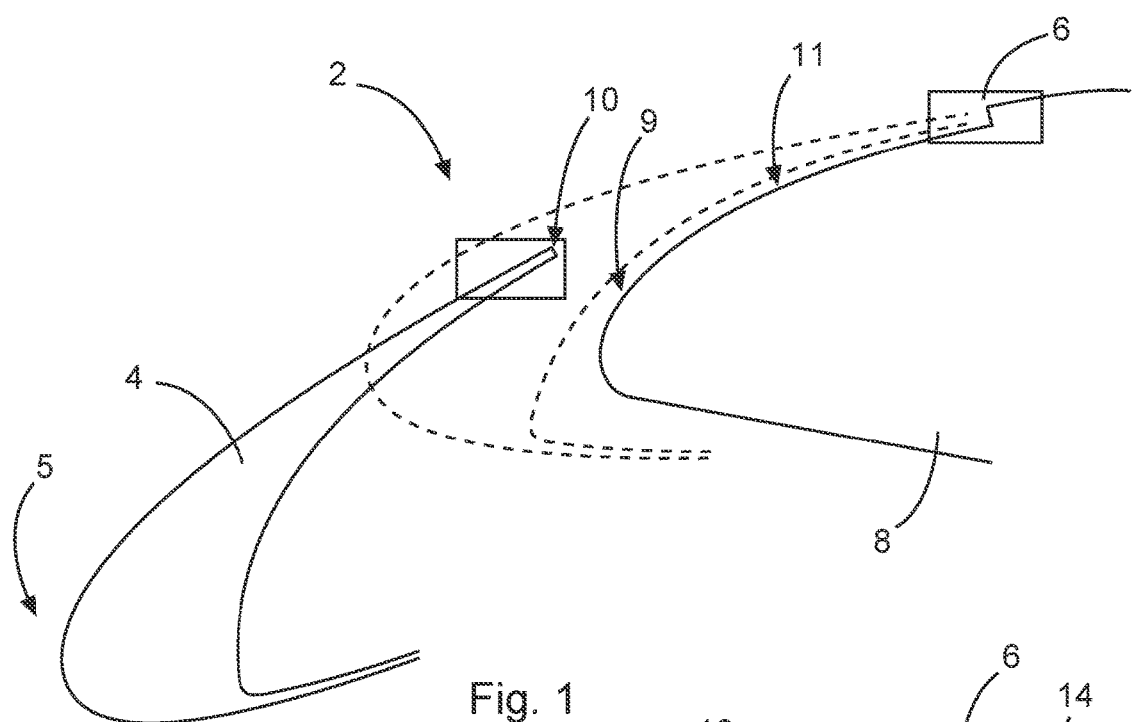
FIG. 1 shows a slat arrangement in a schematic lateral overview.

FIG. 1 shows a slat arrangement 2 for a wing of an aircraft in a schematic sectional view in an extended position. Here, the slat arrangement 2 comprises a movable leading edge slat 4 and a connection section 6. The leading edge slat 4 may extend along a substantially chordwise section of a base wing 8. It may be movable from a retracted position, which is indicated with dashed lines in FIG. 1, and a plurality of extended positions. The base wing 8 comprises a base wing leading edge 9, at which a base wing depression 11 is provided for receiving the slat 4. When moving the slat 4 from the retracted position to extended positions, it conducts a translational motion in combination with a slight rotation. However, this may depend on the type of aircraft, to which the slat 4 is installed.

Figure 2:
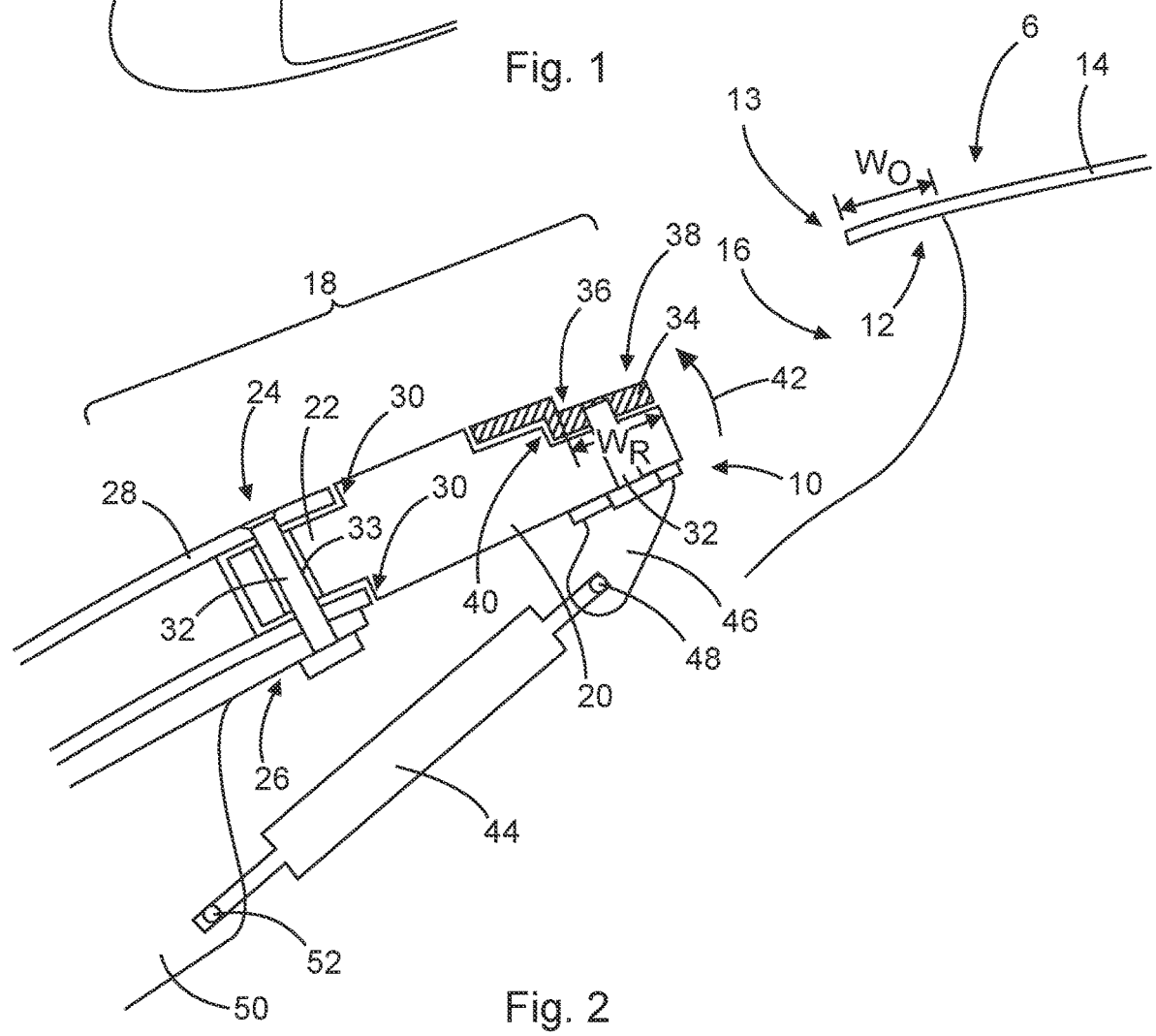
FIG. 2 shows a detail of the trailing edge and the connection section in a cross-sectional view in an extended position.

The connection section 6 may be a part of the base wing 8. A slat trailing edge 10, which is arranged opposite to a slat leading edge 5, comprises a shape that allows to move the trailing edge 10 underneath an overhang (not shown in this illustration). The slat 4 and the base wing 8 then provide a flush and smooth transition. The details of the connection section 6 and the trailing edge 10 are shown in further detail in FIG. 2.

The connection section 6 comprises an overhang 12, which may be a part of a skin 14 of the base wing 8. The overhang has a free end 13 that protrudes from the base wing 8 over a receiving opening 16. Thus, the receiving opening 16 is created and delimited by the overhang 12 for receiving the trailing edge 10.

The slat 4 comprises a trailing region 18, which includes the trailing edge 10. The trailing region 18 is configured to be compressed and/or deformed by the overhang 12 when the trailing edge 10 is moved into the receiving opening 16. This is further supported by the overhang 12 having a greater stiffness than the trailing region 18 of the slat 4. The reduction of the stiffness of the trailing region 18 may be achieved by installing an extension component 20 to the slat 4 in the trailing region 18. For this purpose, the extension component 20 may be made from a suitable plastic material, in particular a thermoplastic material, or a suitable metallic material, such as an aluminum alloy. Consequently, when moving the trailing edge 10 into the receiving opening 16 it is urged into a compressed or deflected position by the stiffer overhang 12.

The extension component 20 may extend along the whole spanwise extension of the slat 4. It may also extend between two end faces of the slat 4, which are not shown in detail in this illustration. For fastening the extension component 20 to the slat 4, it comprises a flange or tongue 22, which is arranged between two sections 24 and 26 of a slat skin 28. The flange 22 comprises second steps 30, which are in a flush contact with the skin 28. Bolts 32 are installed to fix the skin 28 and the flange 22. A bushing 33 may be inserted around the bolts 32 to additionally support the sections 24 and 26 of the slat skin 28 and maintaining their precise position.

Directly at the trailing edge 10, an upper edge component 34 is arranged on an upper side of the trailing region 18. In fact, in this example, the upper edge component 34 is attached to the upper side of the extension component 20. It is made from a metallic material and may as well extend along the substantially complete length in a spanwise direction of the slat 4. It may comprise a higher stiffness than the extension component 20 and may act for protecting the extension component 20. Still further, it comprises a third step 36, which delimits a receiving surface 38. The receiving surface 38 receives the overhang 12, which may comprise a larger chordwise width WO than the receiving surface 38, which has a width WR in chordwise direction. Thus, when moving the trailing edge 10 underneath the overhang 12, the overhang 12 travels along the receiving surface 38 under deforming of the extension components 20. It reaches the third step 36, such that a smooth and even transition between the upper edge component 34 and the overhang 12 is reached.

The extension component 20 also comprises a fourth step 40 for receiving the upper edge component 34. Thus, the upper edge component 34 may precisely be attached to the extension component 20, without creating gaps. For this, also a serious of bolts 32 is provided, which may be distributed along the spanwise direction.

It is advantageous if the trailing edge 10 is pressed onto the inner side of the overhang 12. This can be supported by flexing the extension component 20 in an upward direction 42. For example, this is achievable by a pretensioning of the extension component 20, such that it always slightly urges into the upward direction 42. However, it may also be feasible to provide a spring element 44 at the underside of the slat 4 in the show manner. Directly under the trailing edge 10, a first attachment flange 46 with a first joint 48 may be provided to receive the spring element 44. At a further forward position, which may be slightly forward of the trailing region 18, a second attachment flange 50 is shown with a second joint 52 to hold the spring element 44. Thus, the spring element 44 can exert a pressing force, which urges the first joint 48 and resultantly the trailing edge 10 into the upward direction 42. Thus, when moving the trailing edge 10 underneath the overhang 12, a flush contact of the upper edge component 34 and the overhang 12 is guaranteed.

Figure 3:
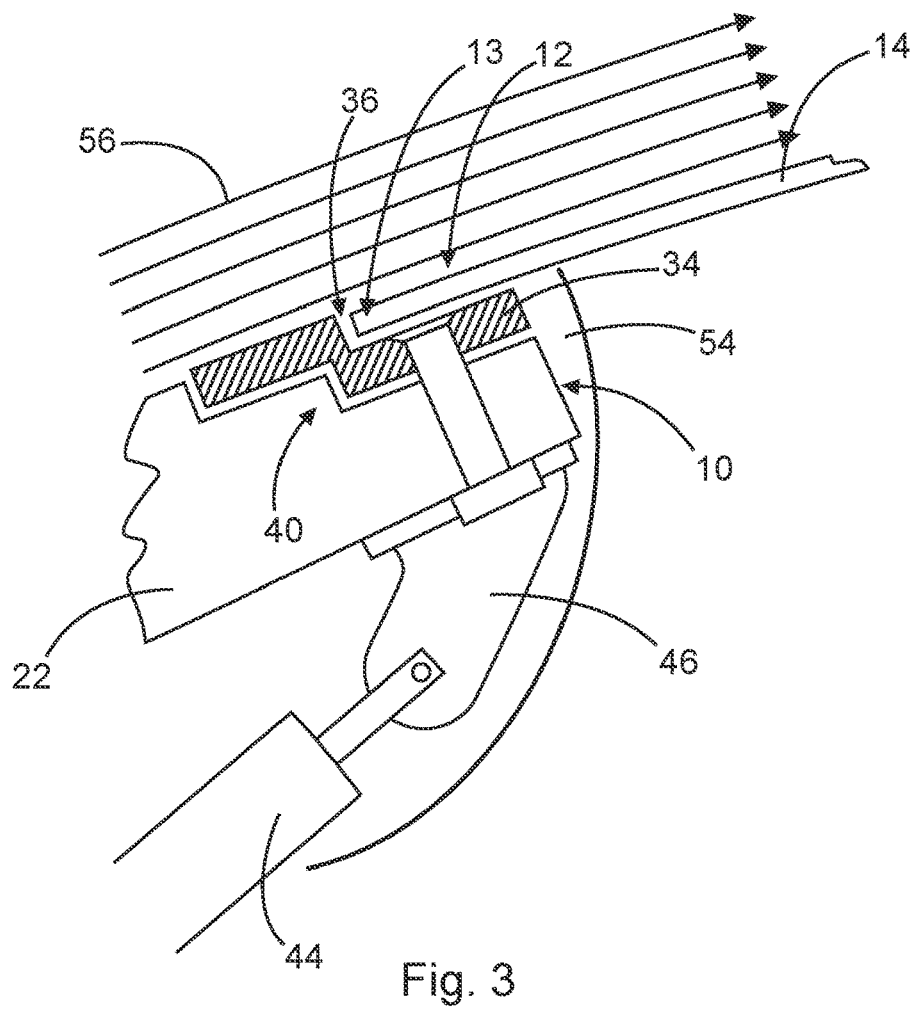
FIG. 3 shows the detail of FIG. 2 in a retracted position.

The retracted position is further shown in FIG. 3. For illustration purposes, i.e., to clearly show the distinct elements, all elements shown enclose a small gap to adjacent elements. However, it is to be understood, that all elements are in a flush contact to each other. Here a slight intermediate space 54 between the trailing edge 10 and the receiving opening 16 can be seen, which allows to fully receive the trailing edge 10 without contacting a rear end of the opening 16. The overhang 12 is in flush surface contact with the upper edge component 34 and the third step 36. Thus, a smooth surface for an airflow 56 is provided.

Figure 4:
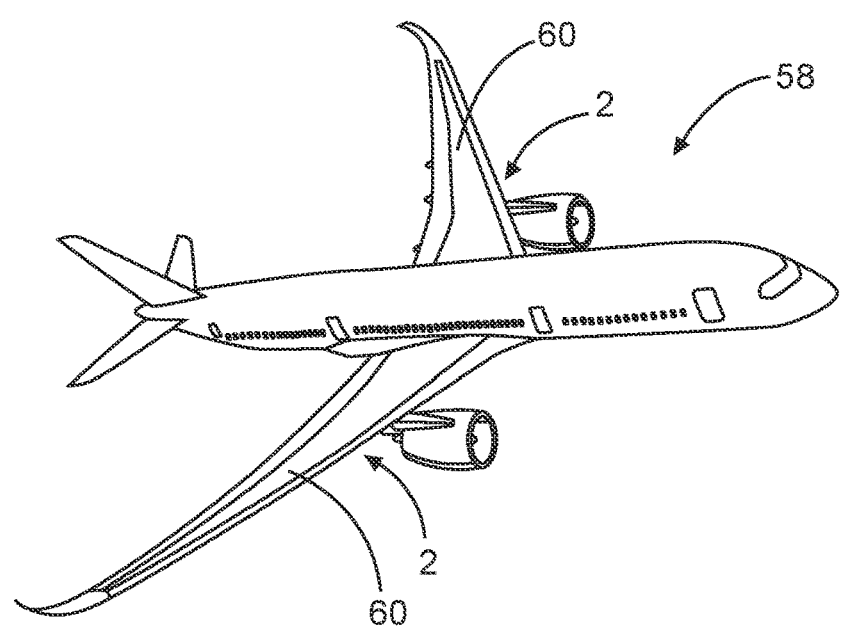
FIG. 4 shows an aircraft with such a slat arrangement.

FIG. 4 shows an aircraft 58 having wings 60, to which such a slat arrangement 2 is attached.

In addition, it should be pointed out that "comprising" does not exclude other elements or steps, and "a" or "an" does not exclude a plural number.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 slat arrangement
4 movable leading-edge slat
5 slat leading edge
6 connection section
8 base wing
9 base wing leading edge
10 trailing edge
11 base wing depression
12 overhang
13 free end
14 skin of base wing
16 receiving opening
18 trailing region
20 extension component
22 flange
24 section of slat skin
26 section of slat skin
28 slat skin
30 second step
32 bolt
33 bushing
34 upper edge component 36 third step
38 receiving surface
40 fourth step
42 upward direction
44 spring element
46 first attachment flange
48 first joint
50 second attachment flange
52 second joint
54 intermediate space
56 airflow
58 aircraft
60 wing
$W_O$ width of overhang
$W_R$ width of receiving surface

The invention claimed is:

1. A slat arrangement for a wing of an aircraft, the arrangement having a movable leading-edge slat and a connection section,
wherein the leading-edge slat comprises a slat leading edge and a slat trailing edge,
wherein the connection section comprises a receiving opening for receiving the slat trailing edge, wherein the connection section comprises an overhang having a free end,
wherein the slat trailing edge is configured to be translated under the overhang, and
wherein a trailing region of the slat comprises an extension component, which delimits the slat at the trailing edge and which extends along a part of the slat in a spanwise direction, and
wherein the extension component is configured to be elastically deformed by the overhang when the slat trailing edge is moved into the receiving opening.

2. The slat arrangement of claim 1, wherein the overhang comprises a greater stiffness than the trailing region of the leading-edge slat.

3. The slat arrangement of claim 1, wherein an upper edge component is arranged on an upper side of the trailing region of the slat trailing edge.

4. The slat arrangement of claim 3, wherein the upper edge component is made from a metallic material.

5. The slat arrangement of claim 3, wherein a transversal cross-sectional profile of the upper edge component comprises a step to receive the overhang.

6. The slat arrangement of claim 3,
wherein the upper edge component comprises a receiving surface for receiving the overhang,
wherein the overhang extends about a greater chordwise length than the receiving surface.

7. The slat arrangement of claim 3,
wherein the trailing region comprises an extension component, which delimits the slat at the trailing edge and which extends along a part of the slat in a spanwise direction, and
wherein the upper edge component is arranged on an upper side of the extension component.

8. The slat arrangement of claim 7, wherein the extension component comprises at least one spanwise step configured to receive the upper edge component.

9. The slat arrangement of claim 1, wherein the extension component is made from a plastic material.

10. The slat arrangement of claim 1, wherein the leading-edge slat comprises an outer skin, which encloses at least a part of the extension component.

11. The slat arrangement of claim 1, wherein the extension component is pre-tensioned to deflect in an upwards direction in an extended position of the slat.

12. The slat arrangement of claim 1, further comprising a spring element that is configured to deflect the extension component upwards.

13. A wing for an aircraft, having a base wing with a base wing leading edge, the wing further comprising at least one slat arrangement of claim 1, wherein the connection section is arranged on the base wing leading edge.

14. The wing of claim 13, wherein the overhang is a part of a wing skin of the base wing.

15. An aircraft, comprising at least one wing according to claim 13.

16. An aircraft, comprising at least one slat arrangement according to claim 1.

* * * * *